Jan. 10, 1950 D. A. LUTON 2,493,766
FISHING REEL
Filed March 19, 1945
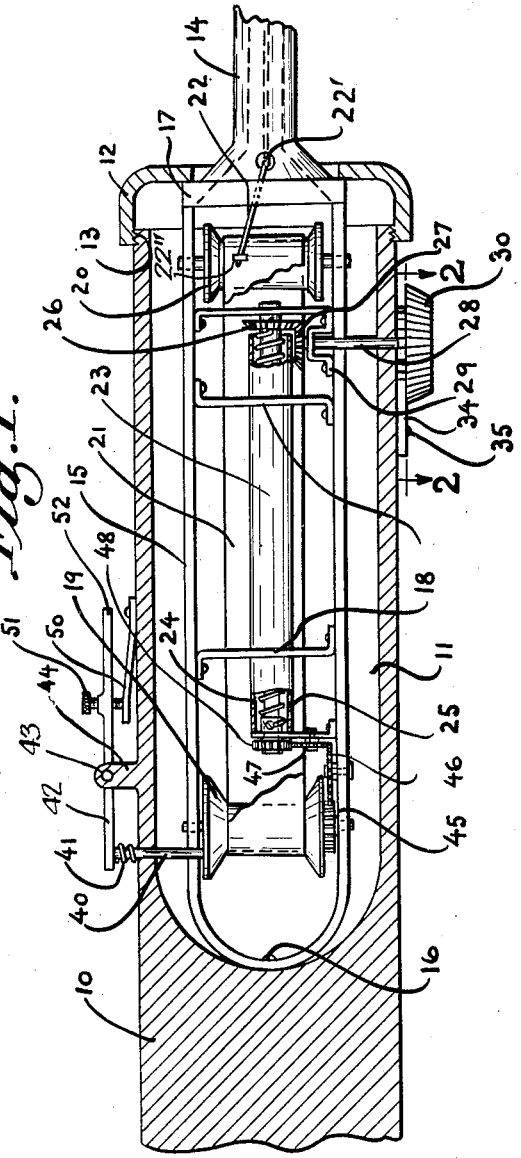
Inventor
Dempsey A. Luton
By *Clarence A. O'Brien and Harvey B. Jacobson*
Attorneys Patented Jan. 10, 1950

2,493,766

UNITED STATES PATENT OFFICE 2,493,766

FISHING REEL

Dempsey A. Luton, Jackson, Wyo., assignor of one-half to Earl M. Johnson, Jackson, Wyo.

Application March 19, 1945, Serial No. 583,523

1 Claim. (Cl. 43—20)

This invention relates to a fishing reel, and more particularly to such a reel adapted to be spring wound.

A primary object of this invention is the provision of an improved, completely self-contained fishing reel, provided with means, whereby, upon the release of the trigger, the reel may be substantially wound, as when a fish or the like strikes.

An additional object of the invention is the provision of such a reel provided with means whereby the spring tensioning the same may be readily rewound, as desired, with a minimum of effort.

Still another object of the invention is the provision of such a reel provided with means whereby the line may be relatively simply and effortlessly wound thereon, by the spring tension thereof, as desired.

Other objects reside in the provision of such a device which will be sturdy and durable in construction, reliable and efficient in operation, and relatively simple and inexpensive to manufacture and install.

Still further objects reside in the combinations of elements, arrangements of parts, and features of construction, all as will be more fully pointed out hereinafter and shown in the accompanying drawings wherein there is disclosed a preferred embodiment of this inventive concept.

In the drawings:

Figure 1 is a side central longitudinal sectional view taken through a fishing reel, and a portion of the rod embodying features of the instant invention.

Figure 2 is a sectional view taken substantially along the line 2—2 of Figure 1, as viewed in the direction indicated by the arrows.

Figure 3 is an enlarged fragmentary view illustrating the detail of construction of the webbing attachment and gearing drive therefor; and Figure 4 is an enlarged fragmentary sectional detail view showing a part of the gear drive which ultimately operates the web.

Similar reference characters refer to similar parts throughout the views of the drawings.

Having reference now to the drawings, there is shown at 10 the hilt or handle of a fishing pole, provided with a longitudinal recess 11, and to the outer extremity of which is secured, as by means of a cap 12 screw-threaded, as at 13, a pole or rod 14. Positioned within the recess 11 is a U-shaped supporting frame or bracket 15, secured at one end, as by a screw 16, to the extremity of the recess, and at its other end, as by a suitable supporting bar 17 within the cap 12. Transverse supporting members 18 extend across the frame to hold the same in related assembly.

Journaled for rotation at opposite extremities of the frame 15 are a pair of rollers or reels 19 and 20, respectively, surrounded by a web belt 21, about which a line 22, or the like, is adapted to be passed, the line extending outwardly through the device through a suitable aperture 22' and being secured to the web belt as by a staple 22'', and extending along the pole 14 in the conventional manner.

Positioned between the folds or loops 21 of the web is a cylinder 23, within which is an axle 24, about which is adapted to be wound a compression spring 25. The axle 24 is adapted to be rotated by a bevel gear 26, which in turn is adapted to be driven by a second bevel gear 27 operated through a shaft 28 mounted in a bracket 29, and extending to a knob 30, exteriorly positioned with respect to a ratchet 31, and keyed thereto, as by a key 33, the ratchet being exterior of the handle portion 10 and controlled by a pawl 34, pivoted, as at 35.

From the foregoing, it will be seen that rotation of the knob 30 occasions through the bevel gears 26 and 27 a rotation and tensioning of the spring 25 about the axle 24. Such tension is retained, as by means of a brake rod 40 pressed, as by a spring 41, in relation to a lever 42 pivotally mounted, as on a pivot 43 and a bracket 44 secured to the handle member 10. The member 40 engages one of the faces of the reel 19, which is provided with a gear 45, which drives through a gear 46 and a gear 47, which in turn engages a gear 48 operable by the axle 24.

An adjustable spring 50, adjustable as by means of a set screw 51 in an extending arm 52 of the lever 42 serves normally to bias the brake member 40 into engagement with the reel 19.

From the foregoing, the operation of the device should be readily understandable. The line is first cast, or otherwise laid out for the requisite distance in the conventional manner, the brake 40 being released by means of the lever 52. Subsequently, the brake is allowed to re-engage the reel 19, and the knob 30 is rotated until the spring 25 is completely tightened. Subsequent to this operation, when a fish strikes the lure or other bait, it is a relatively simple matter to press the lever 52 in such manner as to release the brake 40, permitting relief of the tension of the spring 25, which causes rotation of the reel 19, and through the belt 21 of the reel 20, in such manner as to tightly and efficiently and rapidly rewind the line about the web 21, in such manner as to draw the fish relatively close to the end of the pole.

From the foregoing it will now be seen that there is herein provided an improved spring-tensioned fishing reel accomplishing all the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a spring-pressed fishing reel, in combination, a handle having a recess therein a substantially U-shaped bracket disposed in said recess, a pair of rollers in said recess and carried by said bracket, a web surrounding said rollers about which a line is adapted to be wound, an axle carried by said bracket, gears mounted on said bracket and driving said rollers from said axle, a spring surrounding said axle, means for tensioning said spring, said means including a ratchet and pawl extending exteriorly of said handle, means including a pair of gears operatively connecting said ratchet to said axle, and means for releasing the tension of said spring, said last-mentioned means including an adjustable brake extending exteriorly of said handle, and resilient means biasing said brake toward braking position.

DEMPSEY A. LUTON.

REFERENCES CITED

The following references are of record in the file of this patent:

UNITED STATES PATENTS

| Number | Name | Date |
|---|---|---|
| 491,955 | Singer | Feb. 14, 1893 |
| 739,784 | Harris et al. | Sept. 22, 1903 |
| 769,142 | Atkinson | Sept. 6, 1904 |
| 1,119,474 | Thomson | Dec. 1, 1914 |

FOREIGN PATENTS

| Number | Country | Date |
|---|---|---|
| 44,567 | France | Dec. 5, 1934 |